US 9,262,834 B2

(12) United States Patent
Molnar et al.

(10) Patent No.: US 9,262,834 B2
(45) Date of Patent: Feb. 16, 2016

(54) SYSTEMS AND METHODS FOR PERFORMING SEGMENTATION AND VISUALIZATION OF IMAGES

(75) Inventors: Gyula Molnar, Szeged (HU); Laszlo Rusko, Szeged (HU)

(73) Assignee: General Electric Company, Schenectady, NY (US)

( * ) Notice: Subject to any disclaimer, the term of this patent is extended or adjusted under 35 U.S.C. 154(b) by 252 days.

(21) Appl. No.: 13/561,139

(22) Filed: Jul. 30, 2012

(65) Prior Publication Data

US 2014/0029832 A1  Jan. 30, 2014

(51) Int. Cl.
| | |
|---|---|
| G06K 9/00 | (2006.01) |
| G06K 9/34 | (2006.01) |
| G06K 9/46 | (2006.01) |
| G06K 9/66 | (2006.01) |
| G06T 7/00 | (2006.01) |

(52) U.S. Cl.
CPC ..... *G06T 7/0081* (2013.01); *G06T 2207/10072* (2013.01); *G06T 2207/20104* (2013.01); *G06T 2207/20144* (2013.01); *G06T 2207/30096* (2013.01)

(58) Field of Classification Search
None
See application file for complete search history.

(56) References Cited

U.S. PATENT DOCUMENTS

| | | | |
|---|---|---|---|
| 4,856,528 A | 8/1989 | Yang et al. | |
| 5,757,953 A * | 5/1998 | Jang | 382/132 |
| 5,850,464 A * | 12/1998 | Vogt | 382/128 |
| 6,058,322 A * | 5/2000 | Nishikawa et al. | 600/408 |
| 6,112,112 A * | 8/2000 | Gilhuijs et al. | 600/425 |
| 6,766,043 B2 * | 7/2004 | Zeng et al. | 382/128 |
| 7,260,248 B2 * | 8/2007 | Kaufman et al. | 382/128 |
| 7,430,321 B2 | 9/2008 | Okada et al. | |
| 7,466,848 B2 | 12/2008 | Metaxas et al. | |
| 7,831,081 B2 * | 11/2010 | Li | 382/131 |
| 8,160,344 B2 * | 4/2012 | Shinagawa et al. | 382/131 |
| 8,582,861 B2 * | 11/2013 | Hasslmeyer et al. | 382/133 |
| 8,718,341 B2 * | 5/2014 | Buelow et al. | 382/128 |
| 2002/0102023 A1 * | 8/2002 | Yamauchi | 382/199 |
| 2003/0099390 A1 * | 5/2003 | Zeng et al. | 382/131 |
| 2007/0081710 A1 | 4/2007 | Hong et al. | |
| 2007/0092864 A1 * | 4/2007 | Reinhardt et al. | 435/4 |
| 2007/0206844 A1 * | 9/2007 | Russakoff et al. | 382/132 |
| 2008/0118136 A1 | 5/2008 | Cai et al. | |
| 2009/0097727 A1 | 4/2009 | Jolly et al. | |
| 2009/0097728 A1 * | 4/2009 | Lee et al. | 382/131 |
| 2010/0088644 A1 * | 4/2010 | Dowson et al. | 715/837 |

FOREIGN PATENT DOCUMENTS

| | | |
|---|---|---|
| EP | 2116973 | 11/2009 |
| EP | 2120208 | 11/2009 |
| WO | WO2007/002562 | 1/2007 |

* cited by examiner

*Primary Examiner* — Matthew Bella
*Assistant Examiner* — Jose M Torres
(74) *Attorney, Agent, or Firm* — Dean D. Small; The Small Patent Law Group, LLC (57) ABSTRACT

A method for visualizing an object of interest includes obtaining an image of an object of interest, automatically separating the image into tissue clusters, automatically selecting foreground clusters from the tissue clusters, automatically generating a contour based on the selected foreground clusters, and displaying an image of the object of interest including the foreground clusters and the contour. A system and non-transitory computer readable medium are also described herein.

14 Claims, 9 Drawing Sheets

SYSTEMS AND METHODS FOR PERFORMING SEGMENTATION AND VISUALIZATION OF IMAGES

BACKGROUND OF THE INVENTION

The subject matter described herein relates generally to imaging systems, and more particularly, to systems and methods for performing image segmentation and visualization.

Imaging systems are widely used to generate images of various anatomical features or objects of interest. For example, in an oncology examination, a patient may go through a series of examinations, using for example, a computed tomography (CT) system, a positron emission tomography (PET) system, an ultrasound system, an x-ray system, a magnetic resonance (MR) system, a single photon emission computed tomography (SPECT) system, and/or other imaging systems. The series of examinations is performed to continuously monitor the patient's response to treatment. The images acquired during the examination may be displayed or saved to enable a physician to perform a diagnosis of the patient. Thus, the patient may be scanned with one or more imaging systems selected to provide the most relevant images needed by the physician to perform the medical diagnosis.

To improve the ability of the physician to perform the medical diagnosis, the physician may desire to enhance various relevant features in the images. For example, the physician may desire to enhance anatomical structures, such as tumors or complex organs. However, enhancing complex, large, irregular-shaped, heterogeneous features is time consuming when being manually performed by the physician.

SUMMARY OF THE INVENTION

In one embodiment, a method for visualizing an object of interest is provided. The method includes obtaining an image of an object of interest, automatically separating the image into tissue clusters, automatically selecting foreground clusters from the tissue clusters, automatically generating a contour based on the selected foreground clusters, and displaying an image of the object of interest including the foreground clusters and the contour.

In another embodiment, an imaging system is provided. The imaging system includes an imaging scanner and a processor coupled to the imaging scanner. The processor is configured to obtain an image of an object of interest, automatically separate the image into tissue clusters, automatically select foreground clusters from the tissue clusters, automatically generate a contour based on the selected foreground clusters, and display an image of the object of interest including the foreground clusters and the contour.

In a further embodiment, a non-transitory computer readable medium is provided. The non-transitory computer readable medium is programmed to instruct a computer to obtain an image of an object of interest, automatically separate the image into tissue clusters, automatically select foreground clusters from the tissue clusters, automatically generate a contour based on the selected foreground clusters, and display an image of the object of interest including the foreground clusters and the contour.

DETAILED DESCRIPTION OF THE INVENTION

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although various embodiments are described with respect to a computed tomography (CT) imaging system, it should be noted that various embodiments, including methods and systems for providing contouring and internal segmentation of heterogeneous structures using tissue clustering described herein may be used with other imaging systems. For example, the method and system may be utilized with a positron emission tomography (PET) system, a single photon emission computed tomography (SPECT) system, a magnetic resonance imaging (MR) system, an ultrasound imaging system, and/or an x-ray system, among others.

In various embodiments, methods and/or systems are provided that may be utilized to facilitate contouring heterogeneous objects of interest. The methods described herein are performed at least partially automatically based on manual inputs received by a user. In operation, the method is configured to automatically partition a region of interest (ROI) that is manually selected by the user. In various embodiments, the selected ROI is partitioned into clusters belonging to the object of interest and a set of contours is generated for the object of interest. A technical effect of various embodiments is to provide improved contouring and quantification of the ROI.

Figure 1:
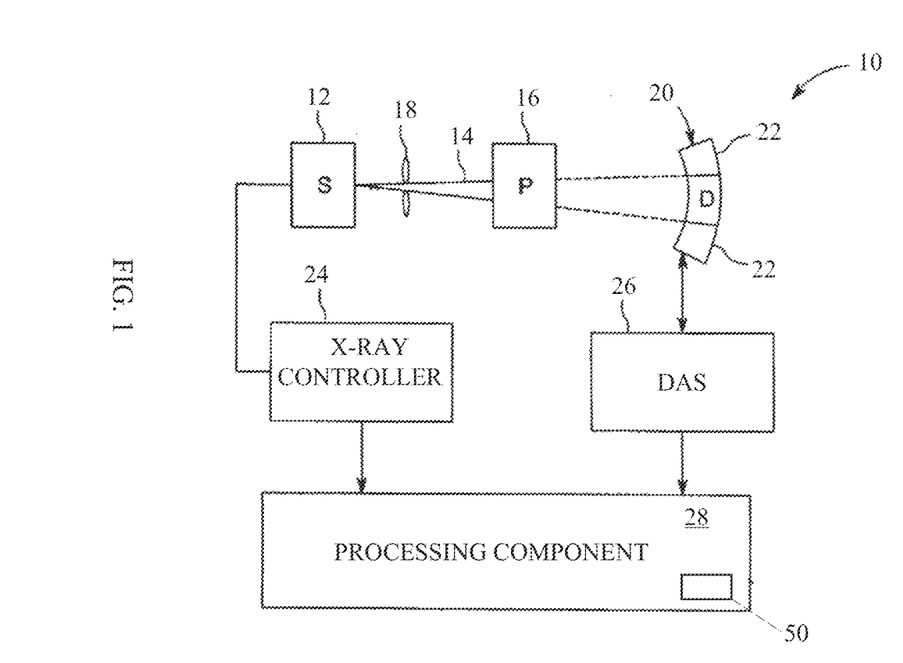
FIG. 1 is a simplified block diagram of a computed tomography (CT) imaging system formed in accordance with various embodiments

FIG. 1 is a simplified block diagram of an imaging system 10 that is formed in accordance with various embodiments. Although the illustrated embodiment is described with respect to a CT imaging system 10, it should be realized that the methods described herein may be utilized with any imaging system.

In the illustrated embodiment, the imaging system 10 includes an x-ray source 12 that is configured to emit radiation, e.g., x-rays 14, through a volume containing a subject 16, e.g. a patient being imaged. In the embodiment shown in FIG. 1, the imaging system 10 also includes an adjustable collimator 18. In operation, the emitted x-rays 14 pass through an opening of the adjustable collimator 18 which limits the angular range associated with the x-rays 14 passing through the volume in one or more dimensions. More specifically, the collimator 18 shapes the emitted x-rays 14, such as to a generally cone or generally fan shaped beam that passes into and through the imaging volume in which the subject 16 is positioned. The collimator 18 may be adjusted to accommodate different scan modes, such as to provide a narrow fan-shaped x-ray beam in a helical scan mode and a wider cone-shaped x-ray beam in an axial scan mode. The collimator 18 may be formed, in one embodiment, from two cylindrical disks that rotate to adjust the shape or angular range of the x-rays 14 that pass through the imaging volume. Optionally, the collimator 18 may be formed using two or more translating plates or shutters. In various embodiments, the collimator 18 may be formed such that an aperture defined by the collimator 18 corresponds to a shape of a radiation detector 20.

In operation, the x-rays 14 pass through or around the subject 16 and impinge on the detector 20. The detector 20 includes a plurality of detector elements 22 that may be arranged in a single row or a plurality of rows to form an array of detector elements 22. The detector elements 22 generate electrical signals that represent the intensity of the incident x-rays 14. The electrical signals are acquired and processed to reconstruct images of one or more features or structures within the subject 16. In various embodiments, the imaging system 10 may also include an anti-scatter grid (not shown) to absorb or otherwise prevent x-ray photons that have been deflected or scattered in the imaging volume from impinging on the detector 20. The anti-scatter grid may be a one-dimensional or two-dimensional grid and/or may include multiple sections, some of which are one-dimensional and some of which are two-dimensional.

The imaging system 10 also includes an x-ray controller 24 that is configured to provide power and timing signals to the x-ray source 12. The imaging system 10 further includes a data acquisition system 26. In operation, the data acquisition system 26 receives data collected by readout electronics of the detector 20. The data acquisition system 26 may receive sampled analog signals from the detector 20 and convert the data to digital signals for subsequent processing by a processor 28. Optionally, the digital-to-analog conversion may be performed by circuitry provided on the detector 20.

The processor 28 is programmed to perform functions described herein, and as used herein, the term processor is not limited to just integrated circuits referred to in the art as computers, but broadly refers to computers, microcontrollers, microcomputers, programmable logic controllers, application specific integrated circuits, and other programmable circuits, and these terms are used interchangeably herein. The processor 28 may be embodied as any suitably appropriate computing device, e.g., a computer, personal digital assistant (PDA), laptop computer, notebook computer, a hard-drive based device, smartphone, or any device that can receive, send, and store data.

Figure 3:
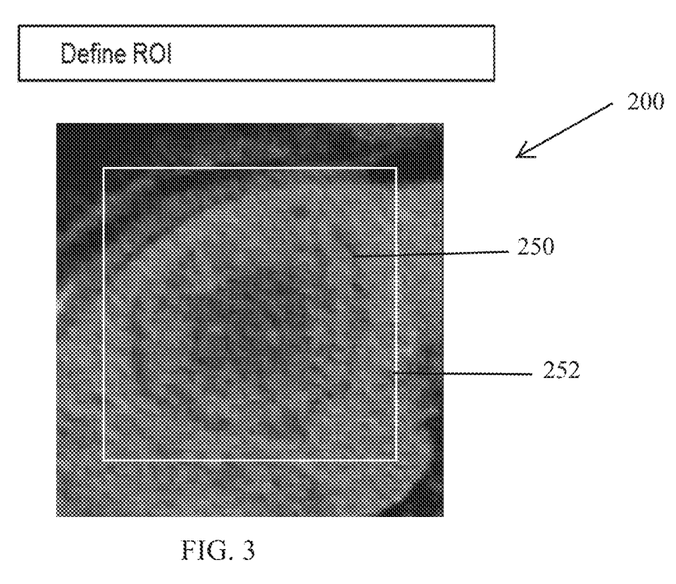
FIG. 3 is an image that may be generated in accordance with various embodiments.

The imaging system 10 also includes an image contouring module 50 that is configured to receive an image or a series of images, such as an image 200 shown in FIG. 3, and implement or perform various methods described herein. In various embodiments, the image 200 may be acquired from any imaging modalities. For example, in the illustrated embodiment, the image 200 is acquired from the CT imaging system 10. In various other embodiments, the image 200 may be a PET image, an ultrasound image, an x-ray image, an MR image, a SPECT image, etc.

The image contouring module 50 may be implemented as a piece of hardware that is installed in the processor 28. Optionally, the fusion image generating module 50 may be implemented as a set of instructions that are installed on the processor 28. The set of instructions may be stand alone programs, may be incorporated as subroutines in an operating system installed on the processor 28, may be functions that are installed in a software package on the processor 28, or may be a combination of software and hardware. It should be understood that the various embodiments are not limited to the arrangements and instrumentality shown in the drawings.

Figure 2:
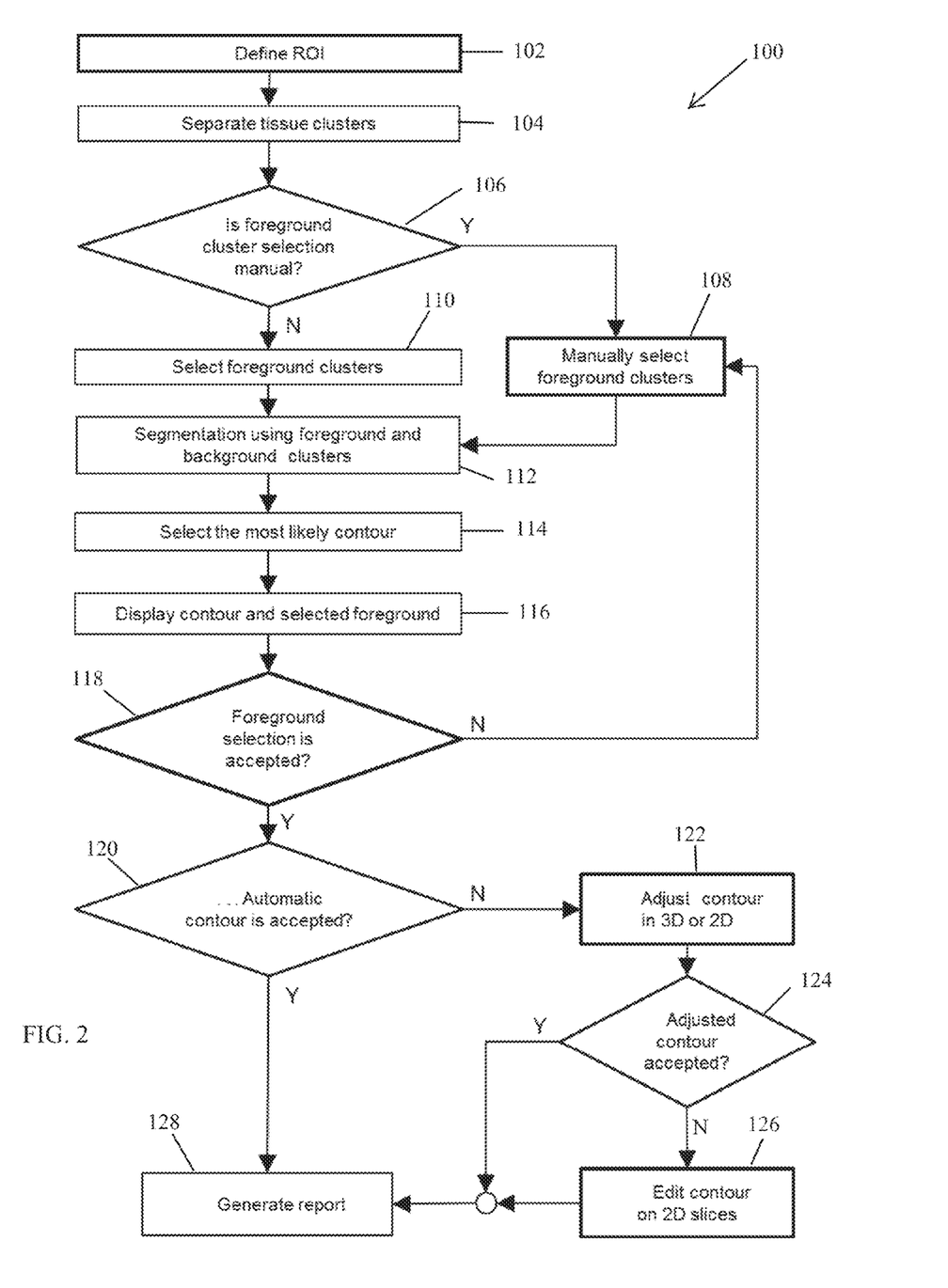
FIG. 2 is a flowchart of a method for automatically contouring heterogeneous objects in accordance with various embodiments.

FIG. 2 is a flowchart of a method 100 for automatically contouring an image in accordance with various embodiments. The method 100 may be implemented as a set of instructions on the image contouring module 50 and/or the processor 28 both shown in FIG. 1. The method 100 may be provided as a non-transitory machine-readable medium or media having instructions recorded thereon for directing the processor 28 or the image contouring module 50 to perform one or more embodiments of the methods described herein. The medium or media may be, for example, any type of CD-ROM, DVD, floppy disk, hard disk, optical disk, flash RAM drive, or other type of computer-readable medium or a combination thereof.

Referring again to FIG. 2, at 102, an image, such as the image 200 shown in FIG. 3, is input to the image contouring module 50. As described above, the image 200 may be acquired from any imaging modality. Moreover, the image 200 may also include an image acquired using a contrast agent. For example, in various embodiments, a contrast agent may be injected into a patient. The patient may then be subsequently scanned to generate the image 200. In various other embodiments, the patient is not injected with the contrast agent prior to scanning the patient to generate the image 200.

It should therefore be realized that in various embodiments, administering a contrast agent to the subject is optional.

The image 200 may also be obtained from data collected during a previous scan of the subject, wherein the image 200 has been stored in a memory. Optionally, the image 200 may be obtained during real-time scanning of the subject. For example, the methods described herein may be performed on images as the images are received from the imaging system 10 during a real-time examination of the subject. Accordingly, in various embodiments, the user may select the image desired for subsequent processing. For example, the user may select the image 200 for subsequent processing or the user may select any other series of images for processing.

At 102, a region of interest is selected using the image 200. For example, FIG. 3 illustrates the image 200. In various embodiments, the user may manually select a region of interest 250 on the image 200 by forming a bounding box 252 around the desired region of interest 250. The region of interest 250 may represent any region in which the user desires to contour, segment, and/or visualize. In various embodiments, the bounding box 252 may be manually drawn as a line, box, or other shape on the image 200 to identify the region of interest 250. Thus, the bounding box 252, defining the region of interest 250, may have any two-dimensional (2D) or three-dimensional (3D) shape. In the illustrated embodiment, the bounding box 252 has a substantially square shape. Optionally, the bounding box 252 may defined by manually identifying a diameter of the bounding box 252, a center of an object of interest, etc. In various other embodiments, the contouring module 50 may be configured to automatically select the region of interest 250 using for example, a tumor detection algorithm, etc. Additionally, clustering may be automatically performed, for example, tissue morphology, tissue texture, or other tissue features.

Referring again to FIG. 2, at 104 in various embodiments, the region of interest selected at 102 is separated into clusters. Cluster as used herein, is defined as a group of voxels having similar characteristics, such as for example, similar densities and/or locations. In operation, the region of interest 250, within the bounding box 252, is separated into tissue clusters by separating the image data within the region of interest 250 into groups, e.g. clusters, such that similar voxels (those of similar signal intensity or location) belong to the same cluster and dissimilar voxels to different clusters. Clustering is based on the premise that voxels in the region of interest 250 may be separated based on the signal intensity of the voxels used to form the image. For example, various organs, tissues, bones, air, water, etc. will have different voxel intensity values and thus may be identified and grouped together to form clusters, such as a tissue cluster, a bone cluster, an organ cluster, etc. Additionally, the various clusters may be defined based on spectral features which represent a correlation between a voxel and a surrounding neighborhood voxels, which is also referred to herein as a texture-based segmentation.

It should further be realized that various organs may have different voxel intensity values and therefore may form separate organ clusters. For example, a heart cluster, a lung cluster, a kidney cluster, a spleen cluster, etc. Moreover, a single organ may have different voxel intensity values. For example, a damaged myocardium may have hypo-enhanced or hyper-enhanced portions which may each be used to from separate clusters. Therefore, at 104, clustering is performed on the image 200 to initially partition the image 200 into clusters of voxels based on the intensity of each voxel in the image data, or tissue morphology, etc. as described above. Various methods may be utilized to differentiate voxel intensities. In the exemplary embodiment, the intensity of each voxel may be displayed on a color scale and/or a grey scale.

Figure 4:
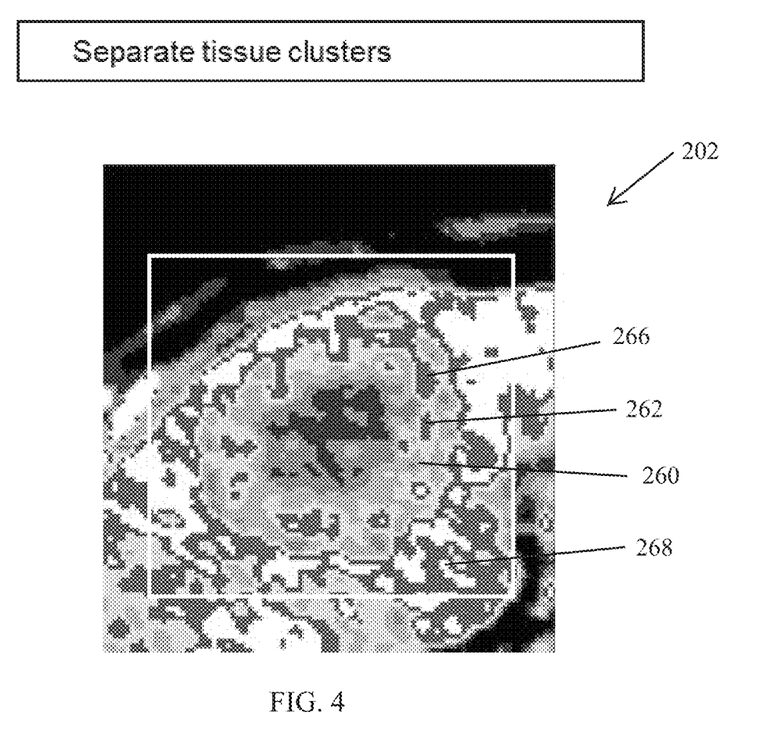
FIG. 4 is an image that may be generated in accordance with various embodiments.

Accordingly, at 104, tissue clustering represents a preliminary segmentation of the ROI 250 which functions to form separate tissue clusters. The tissue clusters, may be based on several image features, such as spectral features. For example, a tumor having a living portion and a necrotic portion is separated into different clusters. For example, FIG. 4 is an exemplary image 202 that illustrates various clusters that may be generated at 104. In the illustrated embodiment, the image 202 includes a set of clusters 260 which represent a tumor 262, and a set of clusters which represent non-tumor tissue surround the tumor. It should be realized that the image 202 includes a plurality of different clusters, and the clusters 260 and 262, are exemplary only.

Referring again to FIG. 2, at 106 the image contouring module 50 is configured to determine if a user desires to manually select a foreground cluster 266, such as the tumor 262. As used herein, a foreground cluster represents a group of voxels that define an object or region which the user desires to segment. In one embodiment, if the user desires to manually select the foreground cluster 266, the method 100 proceeds to 108 wherein the user may manually selects the foreground cluster 266. For example, and referring again to FIG. 4, to manually select the foreground cluster 266, the user may point or select, for example, the tumor 262 which represents the selected foreground cluster 266. Optionally, the user may manually select a necrotic or a living portion of the tumor 262 for segmentation. It should be realized that at 108, the user may manually select any region or object within the bounding box 252 to perform segmentation and the tumor 262 is one example of a foreground cluster 266 that may be selected at 106. Moreover, it should be realized that the user may manually select which cluster belongs to the foreground 266 by clicking or selecting various voxels in the image 202. The user input may be provided by any suitable means, e.g. a keyboard, a mouse, etc.

In another embodiment, if the user desires to have the foreground cluster 266 automatically selected, the method 100 proceeds to 110 wherein the image contouring module 50, for example, automatically selects the foreground cluster 266. In various embodiments, the contouring module 50 may be configured to identify different clusters based on spectral features, such as voxels having similar spectral features are automatically placed in the same cluster. Additionally, the foreground cluster 266 may be automatically selected based on geometry, a size of various regions, a location from the center of the ROI 250, a variation of the standard deviation of voxels within the ROI 250, and/or spatial location, etc.

Figure 5:
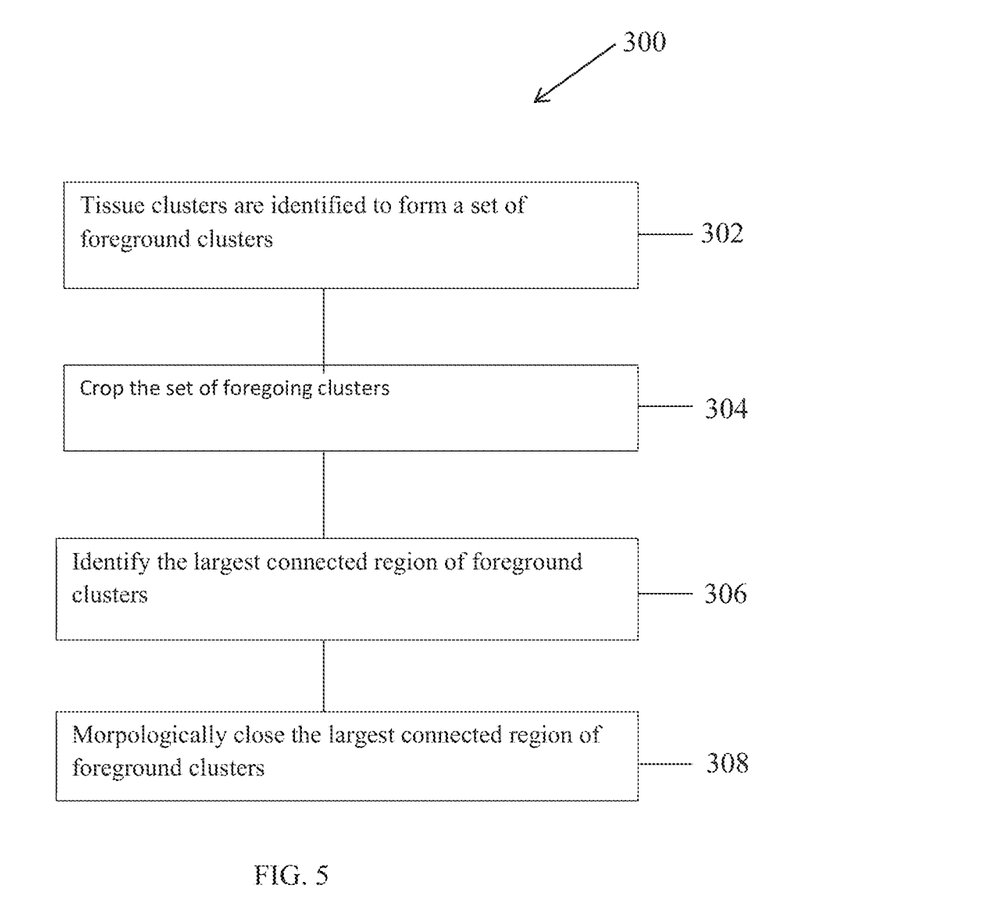
FIG. 5 is a flowchart of a method for selecting clusters in accordance with various embodiments.
Figure 6:
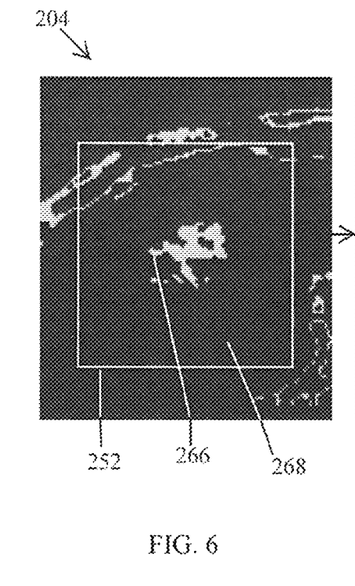
FIG. 6 is an image that may be generated in accordance with various embodiments.
Figure 7:
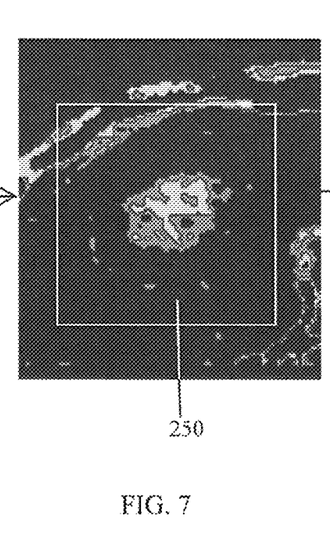
FIG. 7 is an image that may be generated in accordance with various embodiments.

FIG. 5 is a flowchart of a method 300 for automatically selecting foreground clusters as defined in step 110. Initially, FIG. 6 is an exemplary image 204 wherein the foreground clusters 266 have been defined and separated from the background clusters 268. As shown in FIG. 6, the foreground clusters 266 are represented as a lighter shade and the background clusters 268 are represented as a dark or black shade. However, it should be realized that the foreground clusters 266 may be viewed using a first set of color and the background clusters 268 viewed using a second different set of colors.

Figure 8:
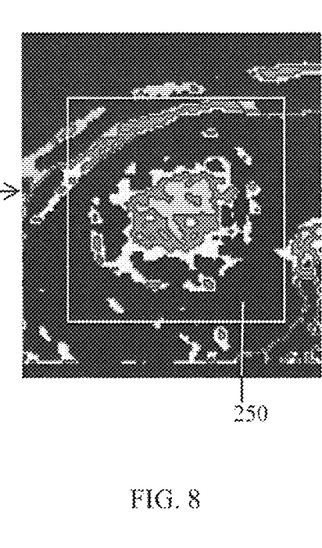
FIG. 8 is an image that may be generated in accordance with various embodiments.
Figure 9:
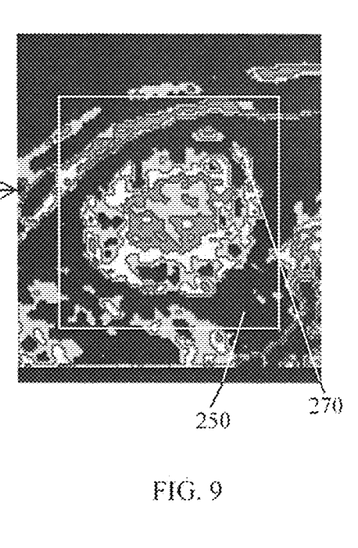
FIG. 9 is an image that may be generated in accordance with various embodiments.
Figure 10:
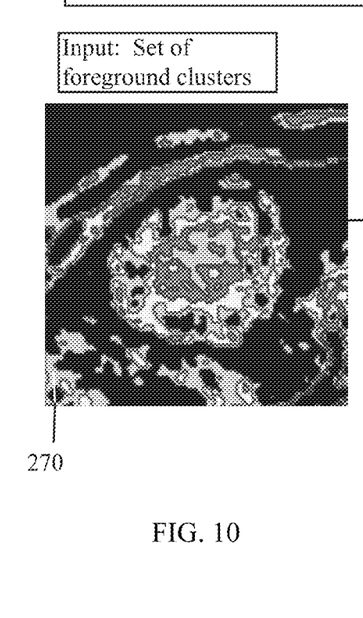
FIG. 10 is an image that may be generated in accordance with various embodiments.

In various embodiments, the method 300 includes identifying at 302 tissue clusters that form a set of tissue clusters. For example, as shown in FIGS. 6-9, the various foreground clusters 266 are identified. The identified foreground clusters 266 are then iteratively added together until the ROI 250 is substantially filled as shown in FIG. 9. More specifically, the foreground clusters 266 are identified based on for example, a distance from a center of the ROI 250. The foreground clusters 266 that are within the predetermined distance of the ROI 250 and within the ROI 250 are then identified as shown in FIG. 8. The foreground clusters 266 that are within the predetermined distance of the ROI 250 and within the ROI 250 thus form a set 270 of foreground clusters as shown in FIG. 10.

Figure 11:
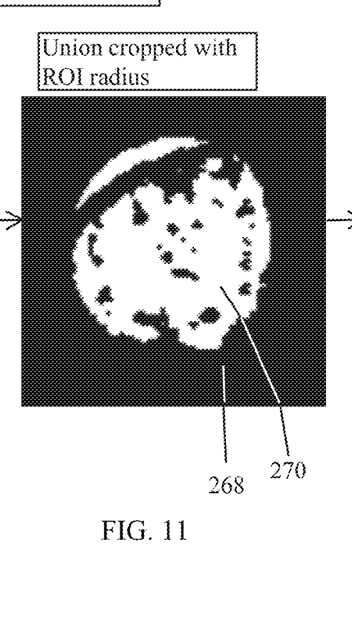
FIG. 11 is an image that may be generated in accordance with various embodiments.

At 304, the set 270 of foreground clusters are cropped. For example, as shown in FIG. 11, the set 270 of foreground clusters is cropped to remove any background clusters 268 from the image as shown in FIG. 11. Thus, in various embodiments, the set 270 of foreground clusters may be displayed using a first color and the background clusters 268 are displayed using a second different color. In the illustrated embodiment shown in FIG. 11, the set 270 of foreground clusters are displayed as white and the background clusters 268 are displayed as black.

Figure 12:
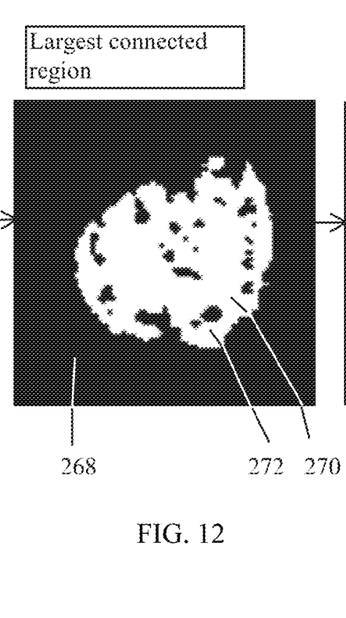
FIG. 12 is an image that may be generated in accordance with various embodiments.

Referring again to FIG. 5, at 306, a largest connected region 272 is identified. As used herein, a connected region is a set of voxels having substantially the same intensity value and each pair of voxels in the set may be connected encountering only voxels involved by the set. For example, voxels identified as water have a similar intensity value and are therefore determined from part of the connected region. Accordingly, FIG. 12 illustrates an exemplary largest connected region 272 that may be formed at 306.

Figure 13:
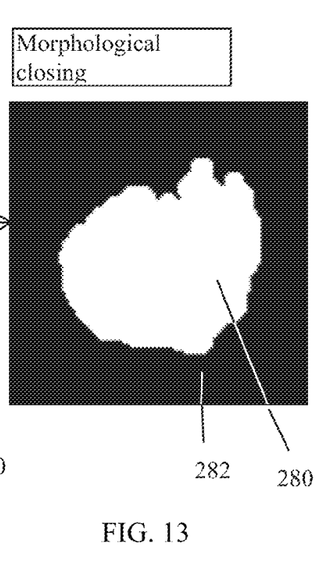
FIG. 13 is an image that may be generated in accordance with various embodiments.

Referring again to FIG. 5, at 308, the largest connected region 272 is morphologically closed. More specifically, the largest connected region 272 is morphologically refined until the largest connected region 272 is substantially homogenous. Homogeneous as used herein means that the pixels within the largest connected region 272 have substantially the same intensity values and thus are displayed as a single color. Moreover, the background pixels may be displayed using a second different color. Accordingly, at 110, the foreground clusters 266 are merged together, the background clusters 268 are merged together, such as to form a resultant image, for example the image 278 shown in FIG. 13 which includes three types of objects, a foreground object 280 which represents the output from step 110, a background object 282 and/or an undefined object.

Figure 14:
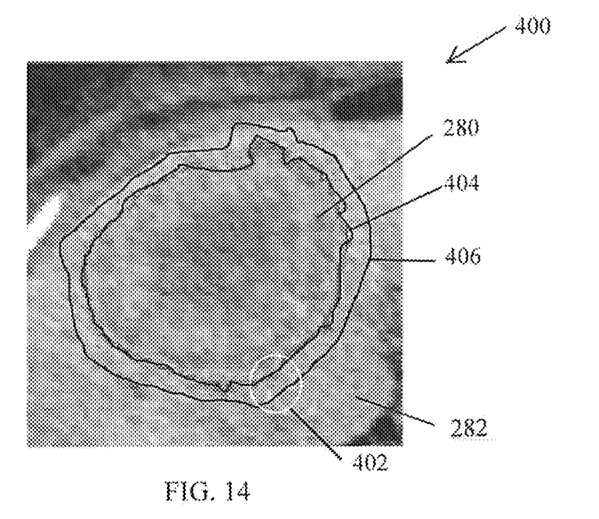
FIG. 14 is an image that may be generated in accordance with various embodiments.
Figure 15:
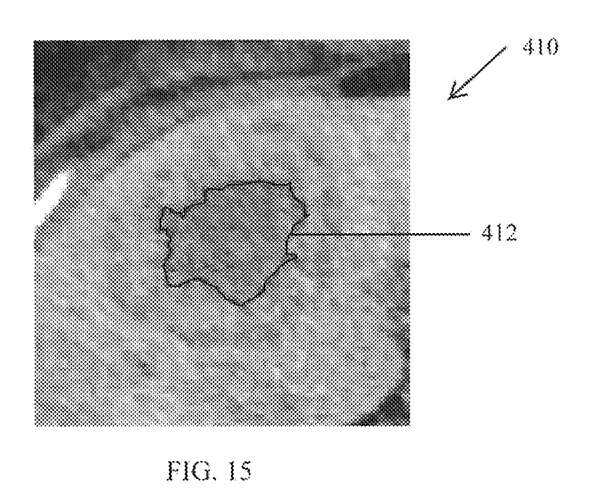
FIG. 15 is an image that may be generated in accordance with various embodiments.

Referring again to FIG. 2, at 112, a segmentation is performed based on the foreground object 280 selected at 110 to generate at least one contour. In various embodiments, the image contouring module 50 is configured to generate a set of contours 402 as shown in FIG. 14. A contour, also referred to herein as a boundary, represents an area between the foreground object 280 and the background object 282 both shown in FIG. 15. In various embodiments, the set of contours 402 is generated between the foreground object 280 and the background object 282 based on the pixel intensity values within each of the respective objects 280 and 282. More specifically, once the foreground object 282 is determined as described above, the foreground object 280 may be segmented from the input image 200, shown in FIG. 3 based on the original pixel intensities of the image 200. The resultant segmented image 400, including the set of contours 402 as shown in FIG. 14 may then be displayed. As shown in FIG. 14, the set of contours 402 may include, for example, a first contour 404 and a second contour 406 that are each configured to substantially circumscribe the region of interest selected at 102. Although the image 400 illustrates a pair of contours, it should be realized that the segmentation performed at 112 may generate one, two, or more than three contours each of which may visually displayed to the user on the image 400.

Referring again to FIG. 2, at 114, the image contouring module 50 is configured to automatically select a contour from the set of contours 402 displayed on the image 400. In the illustrated embodiment, the image contouring module 50 may automatically select the contour 404, for example. At 116, the image and the contour automatically selected at 114 may be displayed to a user.

Referring again to FIG. 2, at 118 the image contouring module 50 is configured to prompt the user to accept the foreground selection. In one embodiment, if the user does not accept the foreground selection, the method proceeds to step 108. At 108, the user may select or deselect clusters that were previously utilized to generate the foreground object 280 shown in FIG. 280. Accordingly, in various embodiments, the user may desire to modify the region of interest 250 utilized to generate the foreground object 280. Therefore, at 118, the method 100 may allow the user to manually add or remove foreground clusters as described above at 108. The image contouring module 50 then repeats steps 112-118 using the revised foreground clusters until the user accepts the foreground selection at 118.

In another embodiment, if the user accepts the foreground selection at 118, the method proceeds to 120. At 120, the image contouring module 50 is configured to prompt the user to accept the contour selection. In one embodiment, if the user accepts the automatic contour generate at 114, the image contouring module 50 is configured to generate an image illustrating the selected contour overlaid onto the image 200.

In another embodiment, if the user does not accept the contour that was automatically selected at 114, the image contouring module 50 is configured to prompt the user to adjust the contour at 122. More specifically, the image contouring module 50 is configured to accept a user input to select another contour from the set generated at 112. For example, the user may use a slider (or keyboard) to select a smaller or larger contour from the set of circumscribing contours to generate a revised contour 412 as shown in the image 410 of FIG. 15. This adjustment can be applied for the contour on selected slice or the whole 3-dimensional contour (all slides of the 3-dimensional image). At 124, the image contouring module 50 is programmed to enable a user to accept the revised contour 412. If the user accepts the revised contour, the method proceeds to step 128 wherein an image, such as the image 410 is generated and displayed showing the revised contour 412. In another embodiment, if the user does not accept the revised contour at 124, then at 126, the image contouring module 50 is configured to enable the user to adjust the contour 404 on a slice-by-slice basis to form the revised contour 412. For example, the user may manually click on a portion of the contour 404 and move the selected portion to a different location.

Described herein are various methods and systems to facilitate contouring anatomical and/or heterogeneous structures. In various embodiments, a ROI is partitioned into clusters. The clusters belonging to the object of interest may then be manually or automatically selected. The selected clusters may then be utilized to generate a contour around an object of interest. Various embodiments described herein enable an object of interest to be quantified in a more precise manner thus improving image segmentation. The methods described herein may also be utilized with any imaging system and applied to any heterogeneous, irregular-shaped structure. More specifically, the clustering in various embodiments enables a more accurate foreground and background separation which provides a more precise image of the object of interest.

Figure 16:
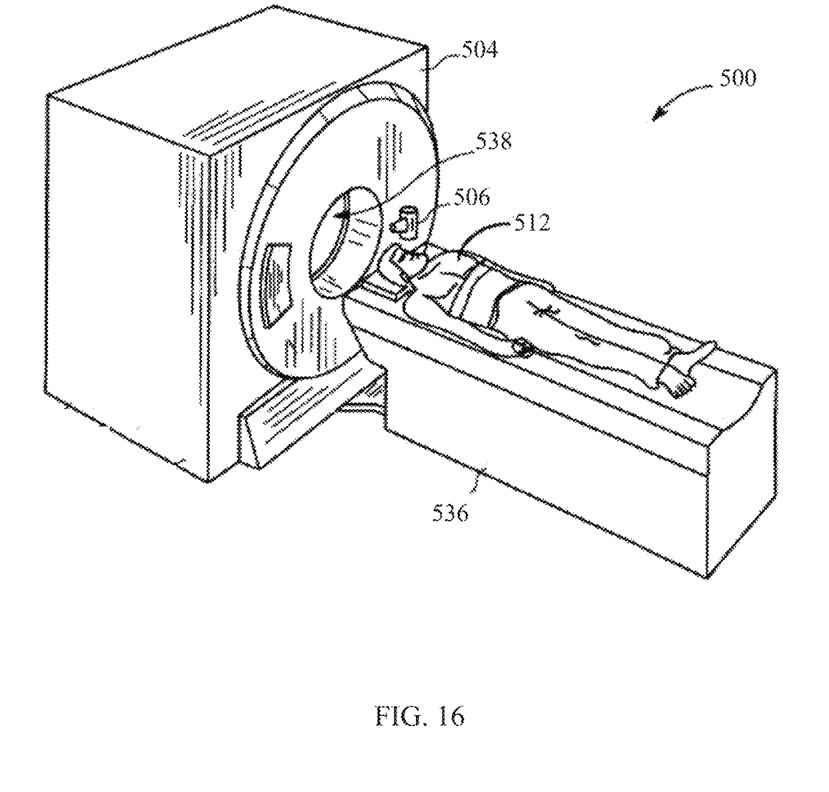
FIG. 16 is a pictorial drawing of a CT imaging system constructed in accordance with various embodiments.
Figure 17:
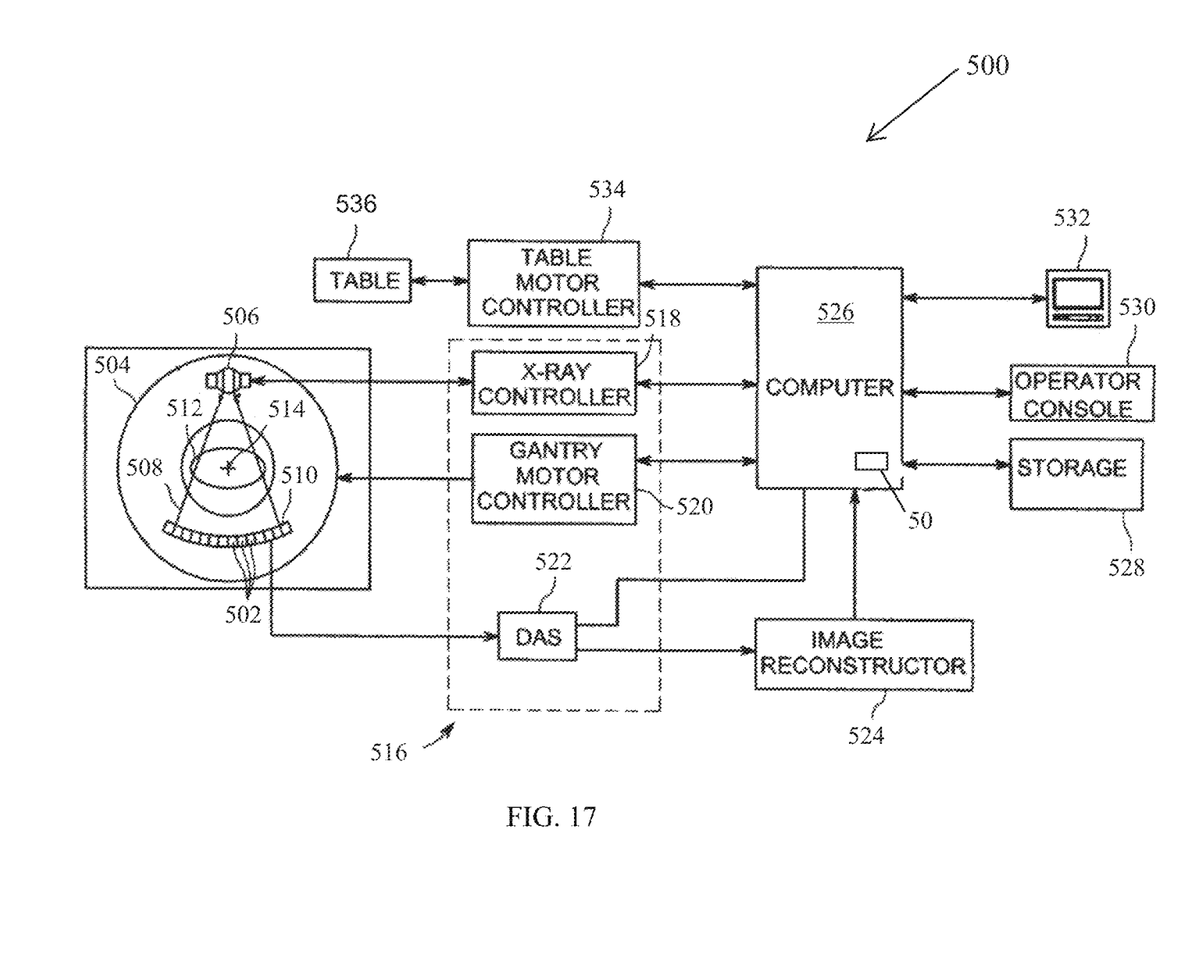
FIG. 17 is a schematic block diagram of the CT imaging system of FIG. 16.

The various methods and the image contouring module 50 may be implemented in an exemplary imaging system. For example, FIG. 16 is a pictorial view of an imaging system that is formed in accordance with various embodiments. FIG. 17 is a block schematic diagram of a portion of the imaging system shown in FIG. 16. Although various embodiments are described in the context of a CT imaging system, it should be understood that other imaging systems capable of performing the functions described herein are contemplated as being used.

Referring to FIGS. 16 and 17, the CT imaging system 500 includes a gantry 504, which includes an x-ray source 506 that projects a beam of x-rays 508 toward a detector array 510 on the opposite side of the gantry 504. The detector array 510 is formed by a plurality of detector rows (not shown) including a plurality of the detectors 502 that together sense the projected x-rays that pass through an object, such as a patient 512 that is disposed between the detector array 510 and the x-ray source 506. Each detector 502 produces an electrical signal that represents the intensity of an impinging x-ray beam and hence can be used to estimate the attenuation of the beam as the beam passes through the patient 512. During a scan to acquire x-ray projection data, the gantry 504 and the components mounted therein rotate about a center of rotation 514. FIG. 17 shows only a single row of detectors 502 (i.e., a detector row). However, the multi-slice detector array 510 includes a plurality of parallel detector rows of detectors 502 such that projection data corresponding to a plurality of quasi-parallel or parallel slices can be acquired simultaneously during a scan.

Rotation of components on the gantry 504 and the operation of the x-ray source 506 are controlled by a control mechanism 516 of the CT imaging system 500. The control mechanism 516 includes an x-ray controller 518 that provides power and timing signals to the x-ray source 506 and a gantry motor controller 520 that controls the rotational speed and position of components on the gantry 504. A data acquisition system (DAS) 522 in the control mechanism 516 samples analog data from the detectors 502 and converts the data to digital signals for subsequent processing. An image reconstructor 524 receives sampled and digitized x-ray data from the DAS 522 and performs high-speed image reconstruction. The reconstructed images, i.e. the series of images 52, are applied as an input to a computer 526 that stores the image in a storage device 528. The image reconstructor 524 can be specialized hardware or computer programs executing on the computer 526. In various embodiments, the computer 526 may include the image contouring module 50 described above.

The computer 526 also receives commands and scanning parameters from an operator via an operator workstation 530 that has a keyboard and/or other user input and/or marking devices, such as a mouse, trackball, or light pen. An associated display 532, examples of which include a cathode ray tube (CRT) display, liquid crystal display (LCD), or plasma display, allows the operator to observe the reconstructed image and other data from the computer 526. The display 532 may include a user pointing device, such as a pressure-sensitive input screen. The operator supplied commands and parameters are used by the computer 526 to provide control signals and information to the DAS 522, the x-ray controller 518, and the gantry motor controller 520. In addition, the computer 526 operates a table motor controller 534 that controls a motorized table 536 to position the patient 512 in the gantry 504. For example, the table 536 moves portions of the patient 512 through a gantry opening 538.

Various embodiments described herein provide a tangible and non-transitory machine-readable medium or media having instructions recorded thereon for a processor or computer to operate an imaging apparatus to perform an embodiment of a method described herein. The medium or media may be any type of CD-ROM, DVD, floppy disk, hard disk, optical disk, flash RAM drive, or other type of computer-readable medium or a combination thereof.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the described subject matter without departing from their scope. While the dimensions and types of materials described herein are intended to define the parameters of the various embodiments of the invention, the embodiments are by no means limiting and are exemplary embodiments. Many other embodiments will be apparent to one of ordinary skill in the art upon reviewing the above description. The scope of the various embodiments of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable one of ordinary skill in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for visualizing an object of interest, said method comprising:
   obtaining an image of an object of interest;
   automatically separating the image into tissue clusters;
   automatically selecting foreground clusters from the tissue clusters, wherein each of the foreground clusters represents a first group of voxels that defines an object or region for segmentation, wherein the foreground clusters are represented by a first shade or color;
   identifying background clusters based on the selected foreground clusters, wherein each of the background clusters represents a second group of voxels separated from the foreground clusters, wherein the background clusters are represented by a second shade or color that differs from the first shade or color;
   generating a set of contours based on the selected foreground clusters and the identified background clusters;
   automatically selecting a contour from the set of contours;
   automatically generating the contour based on the selected foreground clusters and the identified background clusters; and
   displaying an image of the object of interest including the foreground clusters, the background clusters, and the contour.

2. The method of claim 1, further comprising:
   selecting a region of interest in the image; and
   automatically selecting the foreground clusters in the region of interest.

3. The method of claim 1, wherein automatically selecting foreground clusters comprises:
   identifying a plurality of foreground clusters;
   cropping the plurality of foreground clusters; and
   identifying a largest connected region using the cropped foreground clusters.

4. The method of claim 1, further comprising:
   receiving a user input; and
   manually adjusting the contour based on the user input.

5. The method of claim 1, further comprising:
   receiving a user input; and
   modifying the automatically selected foreground clusters based on the user input.

6. The method of claim 1, further comprising:
   receiving a user input; and
   modifying the automatically generated contour based on the user input.

7. An imaging system comprising:
   an imaging scanner; and
   a processor coupled to the imaging scanner, the processor configured to:
     obtain an image of an object of interest;
     automatically separate the image into tissue clusters;
     automatically select foreground clusters from the tissue clusters, wherein each of the foreground clusters represents a first group of voxels that defines an object or region for segmentation, wherein the foreground clusters are represented by a first shade or color;
     identify background clusters based on the selected foreground clusters, wherein each of the background clusters represents a second group of voxels separated from the foreground clusters, wherein the background clusters are represented by a second shade or color that differs from the first shade or color;
     generate a set of contours based on the selected foreground clusters and the identified background clusters;
     automatically select a contour from the set of contours;
     automatically generate the contour based on the selected foreground clusters and the identified background clusters; and
   display an image of the object of interest including the foreground clusters, the background clusters, and the contour.

8. The imaging system of claim 7, wherein the processor is further programmed to:
   receive an input from a user selecting a region of interest in the image; and
   automatically select the foreground clusters in the region of interest.

9. The imaging system of claim 7, wherein the processor is further programmed to:
   identify a plurality of foreground clusters;
   crop the plurality of foreground clusters; and
   identify a largest connected region using the cropped foreground clusters.

10. The imaging system of claim 7, wherein the processor is further programmed to:
    receive a user input; and
    manually adjust the contour based on the user input.

11. The imaging system of claim 7, wherein the processor is further programmed to:
    receive a user input; and
    modify the automatically selected foreground clusters based on the user input.

12. The imaging system of claim 7, wherein the processor is further programmed to:
    receive a user input; and
    modify the automatically generated contour based on the user input.

13. A non-transitory computer readable medium being programmed to instruct a computer to:
  obtain an image of an object of interest;
  automatically separate the image into tissue clusters;
  automatically select foreground clusters from the tissue clusters, wherein each of the foreground clusters represents a first group of voxels that defines an object or region for segmentation, wherein the foreground clusters are represented by a first shade or color;
  identify background clusters based on the selected foreground clusters, wherein each of the background clusters represents a second group of voxels separated from the foreground clusters, wherein the background clusters are represented by a second shade or color that differs from the first shade or color;
  generate a set of contours based on the selected foreground clusters and the identified background clusters;
  automatically select a contour from the set of contours
  automatically generate the contour based on the selected foreground clusters and the identified background clusters; and
  display an image of the object of interest including the foreground clusters, the background clusters, and the contour.

14. The non-transitory computer readable medium of claim 13, further programmed to instruct the computer to:
  receive an input from a user selecting a region of interest in the image; and
  automatically select the foreground clusters in the region of interest.

* * * * *